UNITED STATES PATENT OFFICE.

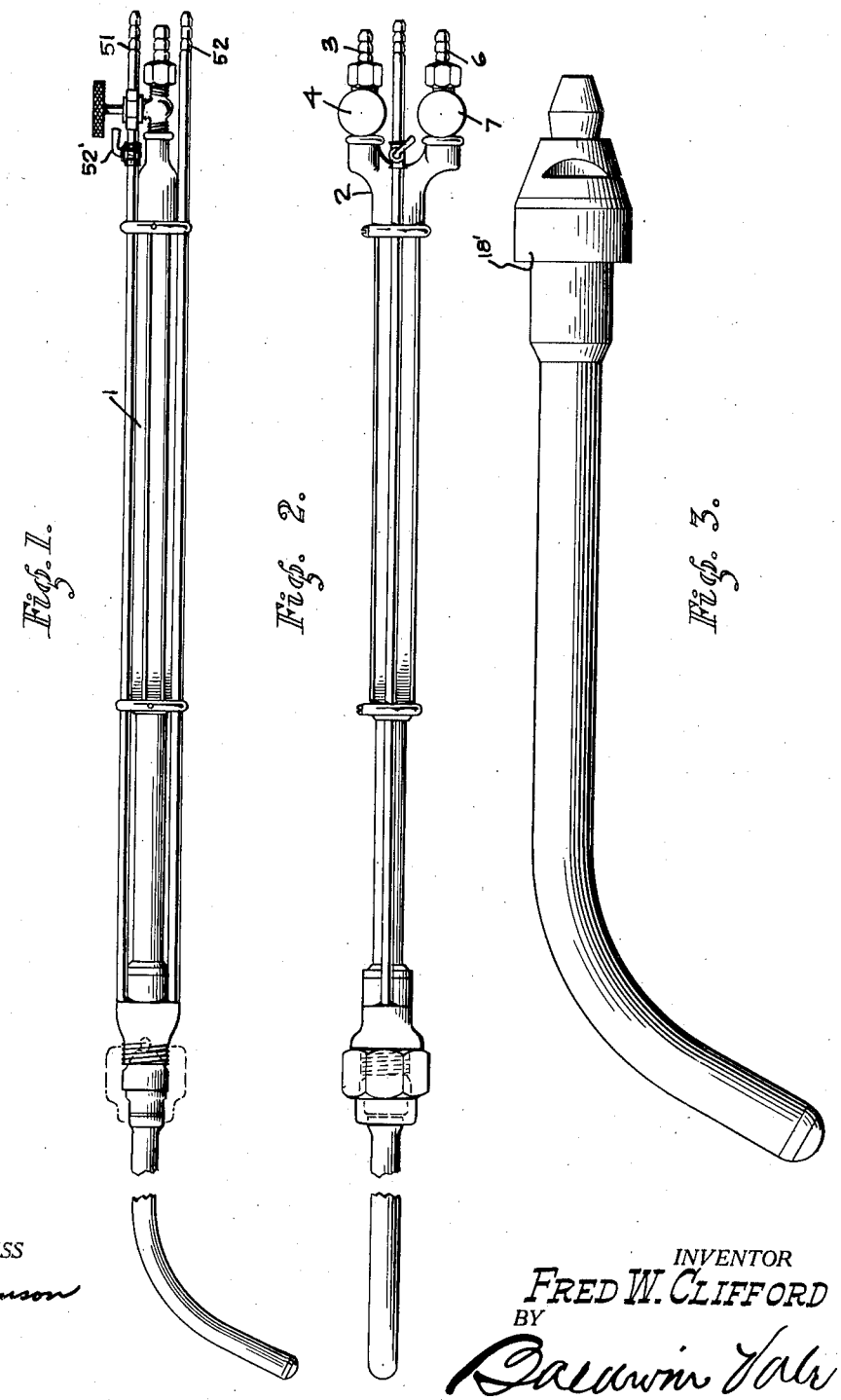

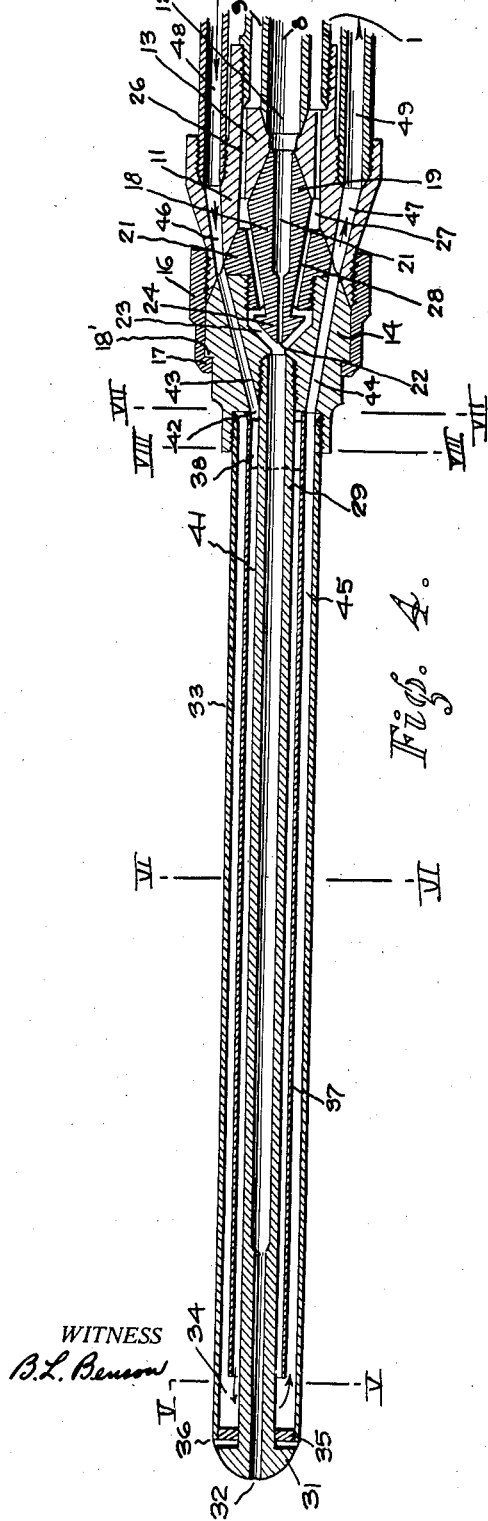
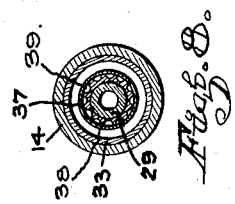
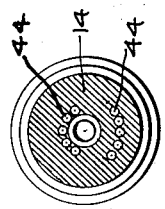

FRED W. CLIFFORD, OF SAN FRANCISCO, CALIFORNIA, ASSIGNOR TO VICTOR APPARATUS COMPANY, OF SAN FRANCISCO, CALIFORNIA, A CORPORATION OF NEVADA.

BLOW-TORCH.

1,344,988.     Specification of Letters Patent.     Patented June 29, 1920.

Application filed December 30, 1918. Serial No. 268,797.

*To all whom it may concern:*

Be it known that I, FRED W. CLIFFORD, a citizen of the United States, and a resident of the city and county of San Francisco, State of California, have made a new and useful invention—to wit, Improvement in Blow-Torches; and I do hereby declare the following to be a full, clear, concise, and exact description of the same.

The invention relates particularly to cooling means for blow-torches, and has for its object to protect the torch from convection of heat reacting from the flame issuing therefrom, insuring a cool mixture with consequent efficiency and economy.

Another object of the invention is to provide a simple and effective coupling means between the burner nozzle and the mixing chamber of the torch, to facilitate the changing of nozzle in connection with the cooling system.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

In the accompanying two sheets of drawings,

Figure 1 is a side elevation of a blow torch constructed in accordance with this invention.

Fig. 2 is a plan view from above of the same.

Fig. 3 is a side elevation in enlarged detail of the burner nozzle and the coupling plug thereon.

Fig. 4 is a longitudinal section in fragmentary detail illustrating the burner nozzle and the manner of its connection with the mixing elements of the torch.

Fig. 5 is a cross section taken on the line V—V Fig. 4.

Fig. 6 is a similar view taken on the line VI—VI Fig. 4.

Fig. 7 is a similar view taken on the line VII—VII.

Fig. 8 is a cross section taken on the line VIII—VIII of Fig. 4.

Oxy-acetylene blow torches used in welding and cutting metals, generate a very high temperature, between six and eight hundred degrees, which temperature, by convection, heats the torch to a degree interfering with the proper mixture of the oxygen and acetylene gas, or other fuel constituents, particularly when the burner nozzle of such torches is inserted within a hole or a confined space. When the burner nozzle becomes heated the gas is apt to fire back to the mixing chamber destroying the utility of the torch until the temperature is reduced. It is the primary object of this invention to overcome that condition by a water-cooling circulatory system within the burner nozzle and adjacent to the mixing chamber.

In detail, the construction illustrated in the drawings includes, the body or casing 1, having the Y shape yoke fitting 2 screwed thereon, into which the oxygen service pipe 3 is screwed, and controlled by the valve 4. The similar acetylene service pipe 6 is screwed into the fitting 2 and controlled by the valve 7. The oxygen service is led from the fitting 2 into the center tube 8 located concentrically within the casing 1. The acetylene service leads to the annular space 9 surrounding the tube 8. The casing 1 is screwed into the plug 11 (see Fig. 4) while the tapered end 12 of the tube 8 fits in a tapered socket formed in the plug 11. The outer end of the socket 11 tapers outwardly to form a cone-shaped socket into which the similarly tapered plug 14 is fitted to form a gas and water-tight joint therewith. This plug 14 is snugly drawn tight by the sleeve 16 threaded on the socket 11 and having an annular flange 17 engaging the shoulder 18 on the plug 14. When the sleeve 16 is screwed tight the plug 14 and socket 11 form a tight fit on their contacting surfaces. The mixing head 18 has a tapered end 19 extending into a similarly tapered socket in the socket 13 coaxial with the tube 8. The body 21 of the mixing plug is screwed into the plug 14 against a shoulder, so that the tapered joint 19 with the socket 13 forms a gas-tight joint when the sleeve 16 is pulled up tight. The acetylene gas flows through the bore 21 in the plug 18 and issues at 22 into the annular cone-shaped mixing chamber 23 formed in the plug 14 and surrounding the flared head 24 of the mixing plug. The oxygen flows through the annular space 9, through the holes 26 in the socket 11, into the annular space 27, from whence it escapes through the holes 28 bored in the plug 18 and connecting with the mixing chamber 23 behind the flared head 24. The acetylene gas and oxygen thoroughly mixed within the mixing chamber 23 escape through the fuel tube 29 that is screwed into the plug 14 and extends forward and terminates in the tip 31, from the opening 32 of which the mixed oxygen and acetylene escape and are ignited at the tip 31 for use in the usual manner. The outer shell 33 of the nozzle is likewise screwed into the plug 14, forming the annular space 34 between the tube 29 and the outer shell 33. The lower end of this space is sealed off by the plug 35 welded to the overhanging tip as at 36. This annular space is again divided by the intermediate tube 37 threaded over the extension 38 on the plug 14. This extension 38 has milled slots 39 cut longitudinally at intervals therearound, to provide the water inlet into the annular space 41 between the tube 29 and the tube 37. These slots 39 communicate with the annular space 42 behind the extension 38 which in turn communicates with the water inlet 43 consisting of a hole bored obliquely through the plug 14. A similar hole 44 on the opposite side communicates with the annular space 45 between the outer tube 33 and the intermediate tube 37, providing an outlet for the water. These holes 43 and 44 in turn register with the holes 46 and 47 bored in the socket 11. The inlet pipe 48 is screwed into and communicates with the hole 46 and the outlet pipe 49 is screwed into and communicates with the hole 47.

This invention operates substantially as follows:—

A suitable hose connection is made with the nipple 51 and connected to a source of water supply. A similar connection is made to the nipple 52 for draining the waste waters away from the torch.

The acetylene supply valve 7 is slightly opened permitting acetylene gas to flow through the space 9 to the mixing chamber 23 and thence outward through the tube 29 and is ignited at the tip orifice 32. The oxygen valve 4 is then opened permitting oxygen to flow through the tube 8, which issuing from the orifice 22 picks up the acetylene gas in the mixing chamber 23 mixing therewith, and this mixture flows through the tube 29 and is ignited at the tip 32 to form a combination flame made up of acetylene gas and oxygen, the high temperature of which is well known.

The cold water supplied at the nipple 51 controlled by the valve 52' in the tube 48, flows through the hole 46 into the hole 43, thence through the annular space 41 surrounding the tube 29 and issues from the end of the tube 37 into the space 34, thence it returns between the tube 37 and the outer tube 33 to the hole 44 registering with the hole 47, thence outward through the tube 49 to the nipple 52 connected with a waste pipe not shown. By this arrangement, the cold water circulates through the space 41 around the mixing tube 29 and escapes from the space 45 as described. This circulation of cold water maintaining a low temperature in the burner tip, prevents the same from becoming overheated by convection and causing back fire of the gases to the mixing chamber 23, which occurs when the temperature rises in the mixture of gas and oxygen. It is necessary to maintain ignition of the flame only at the point of egress 32 of the tip. This proper temperature can always be maintained irrespective of the surrounding conditions of the nozzle if the water is kept circulating therethrough as provided for by this invention. The object of the conical member 24 within the concentric conical inlet 23 is to provide a narrow passage to break or interrupt backfiring. The projecting flange of the cone 24 forms a narrow edge functioning as a heat conductor and forming a tortuous passage through which the flame in backfiring is interrupted.

Modifications within the skill of mechanics practising this invention will suggest themselves in adapting this invention to particular uses, involving the mixing of different flame constituents, and special tips either straight or bent into special shapes, and I do not wish to be understood as confining this invention to the specific disclosure herein shown and described.

Having thus described this invention, what I claim and desire to secure by Letters Patent is:—

A blow torch comprising a body with a socket plug thereon having an outwardly flared socket therein, and fuel and water connections leading therethrough; a tapered plug fitting said socket and having a mixing chamber therein and fuel and water passages therethrough registering respectively with said similar passages through said socket plug; means for drawing said tapered and said socket plugs together; a nozzle comprising a fuel tube fixed in said tapered plug and open to said mixing chamber; a tip on said fuel tube; and a water jacket surrounding said fuel tube and open to said water passages.

In testimony whereof I have hereunto set my hand at San Francisco, California, this 26th day of November, 1918.

FRED W. CLIFFORD.

In presence of—
  LINCOLN C. JOHNSON.